UNITED STATES PATENT OFFICE.

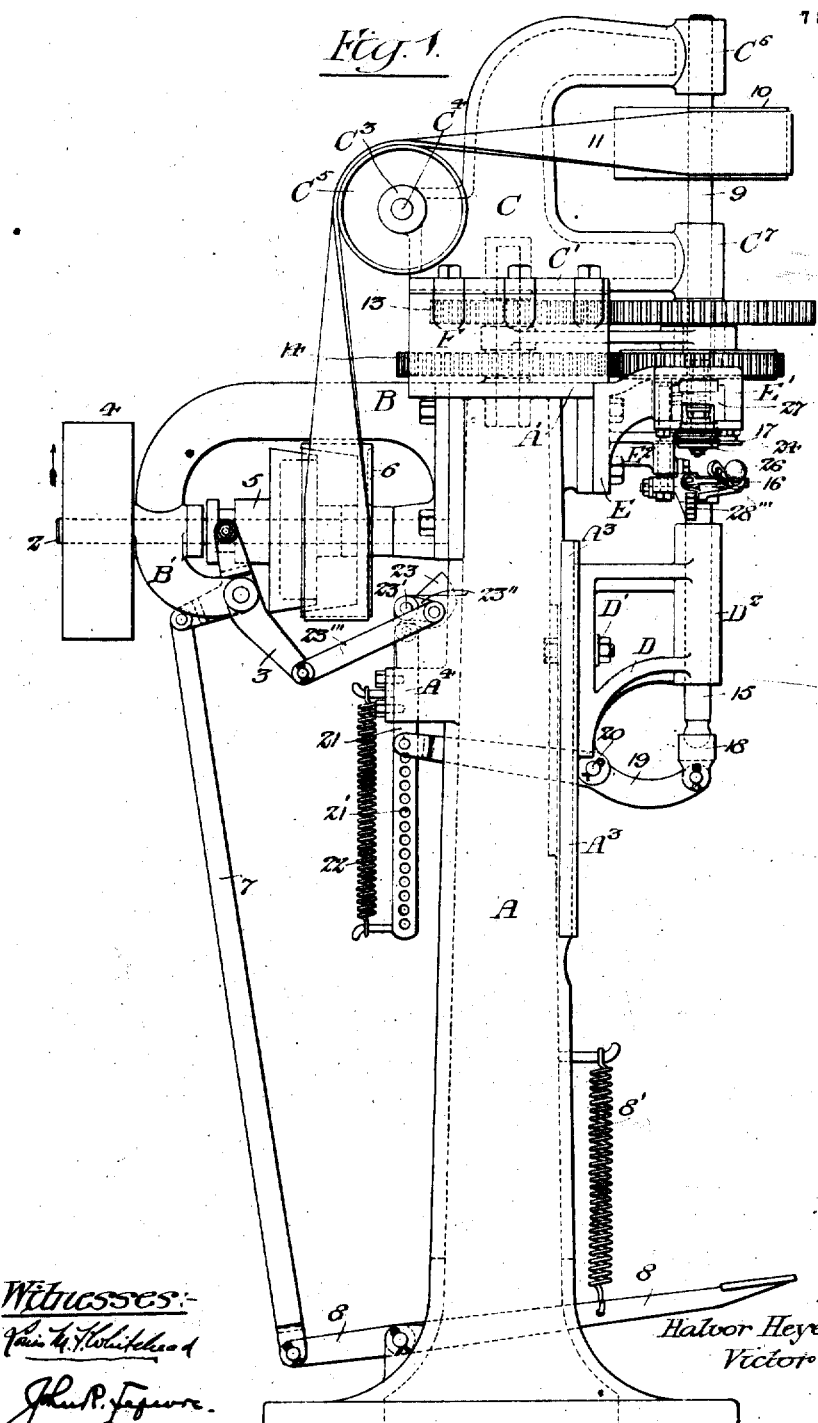

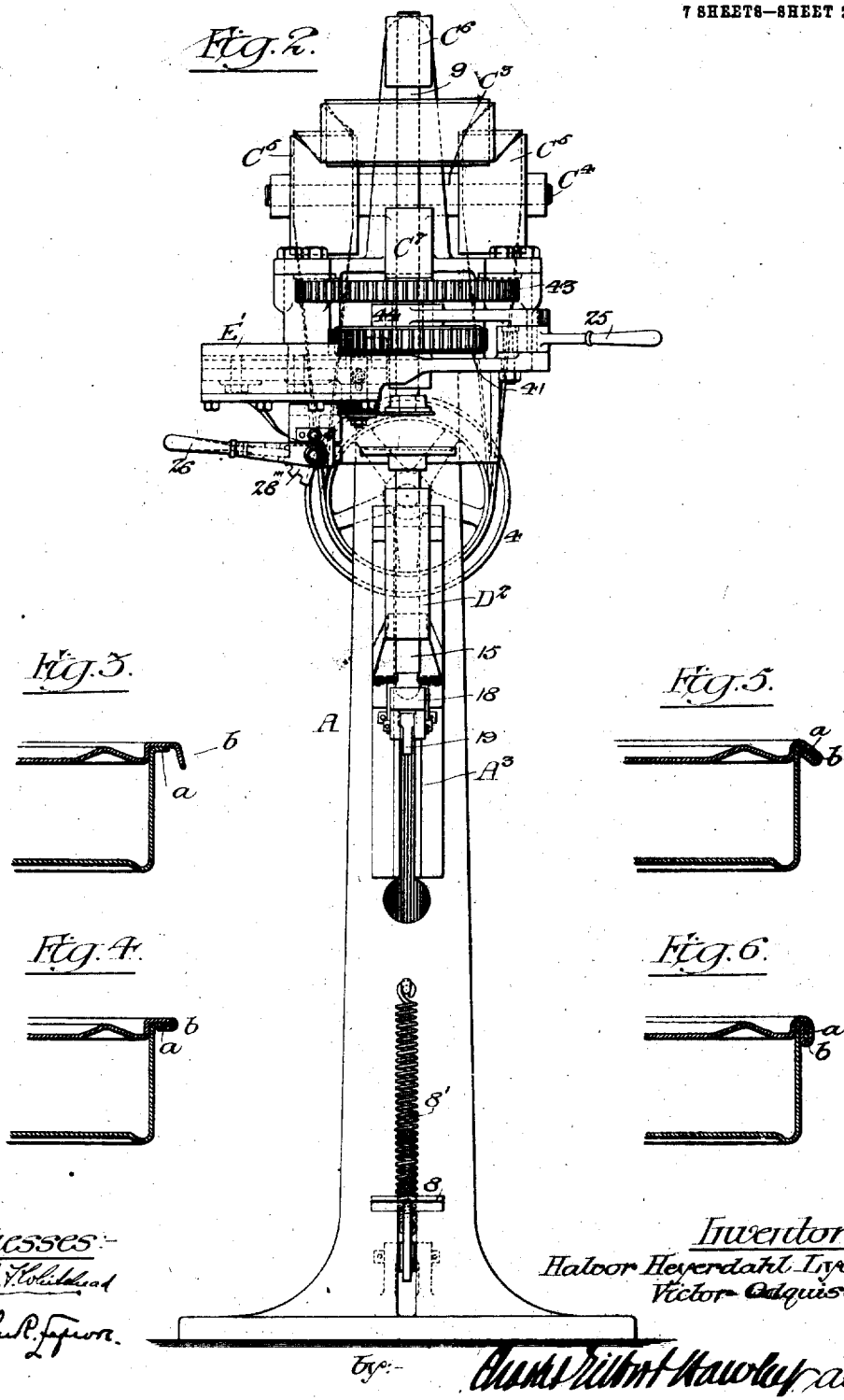

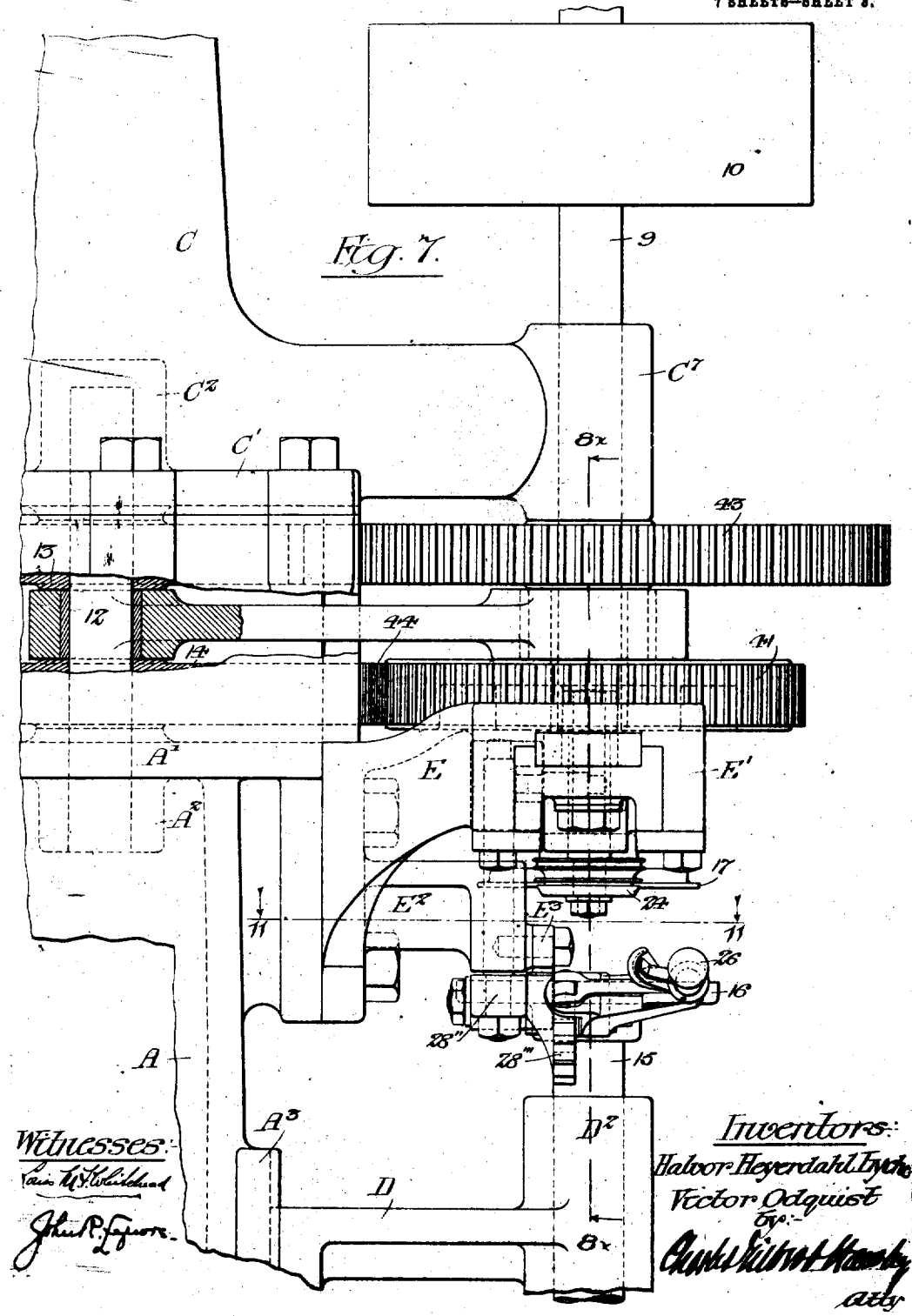

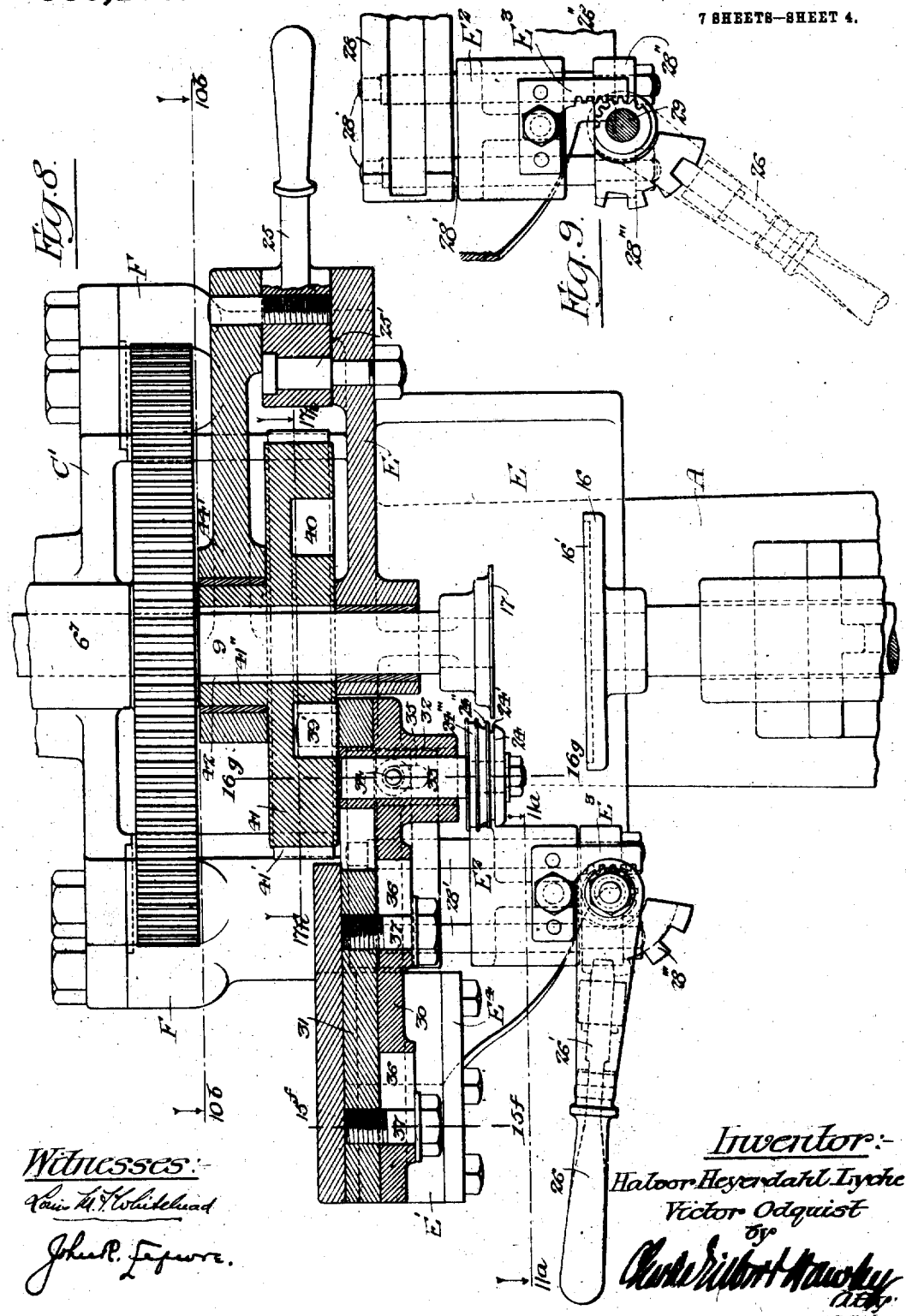

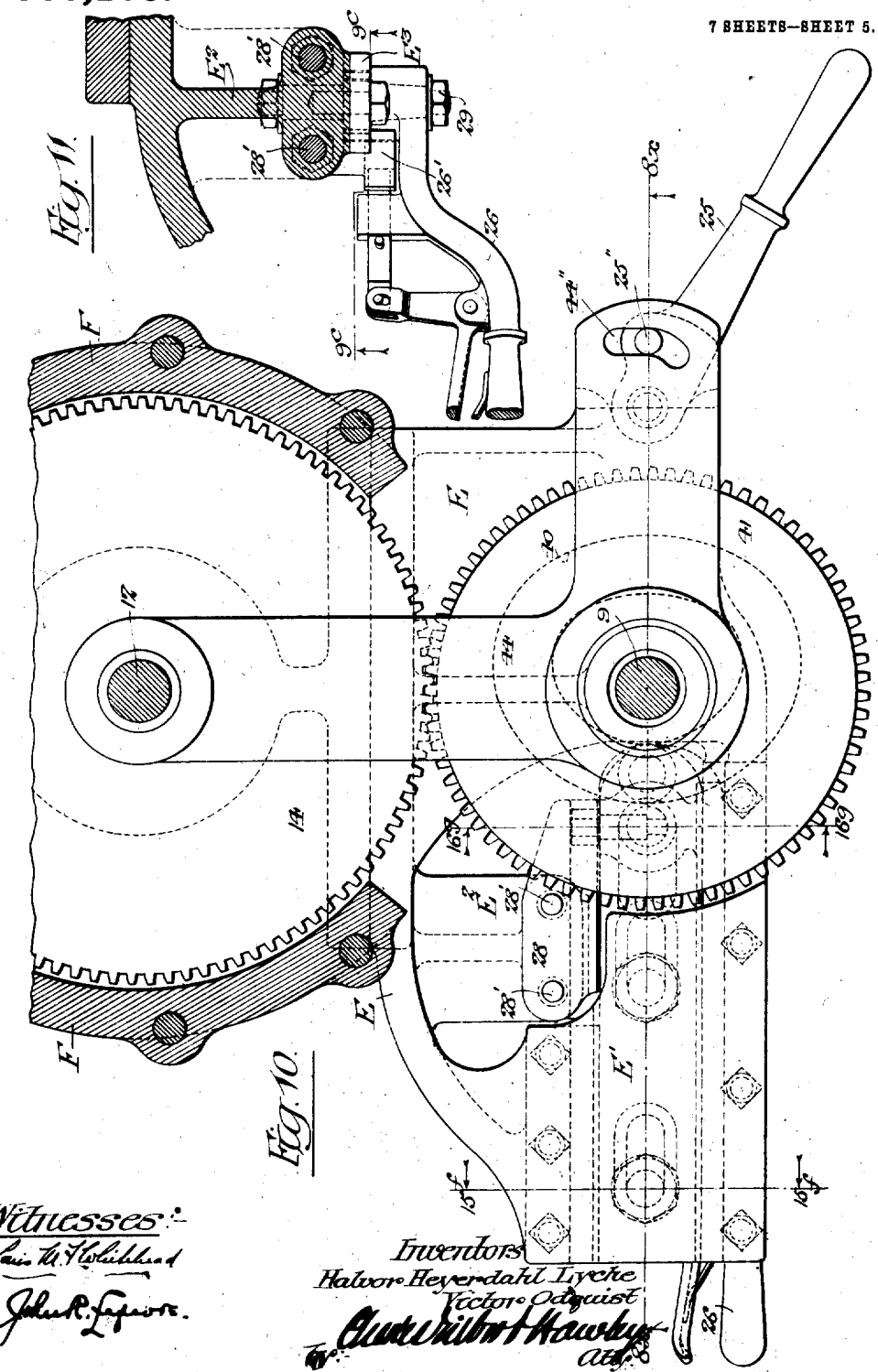

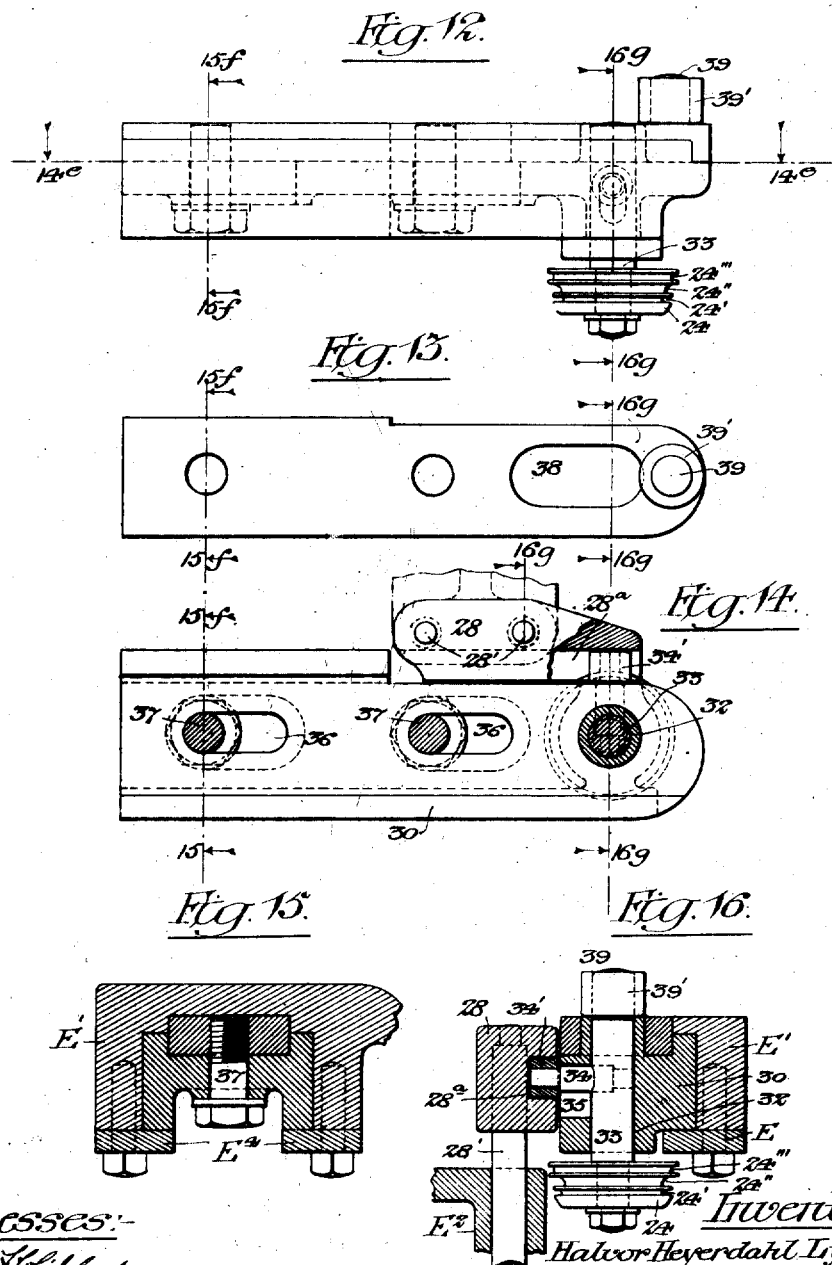

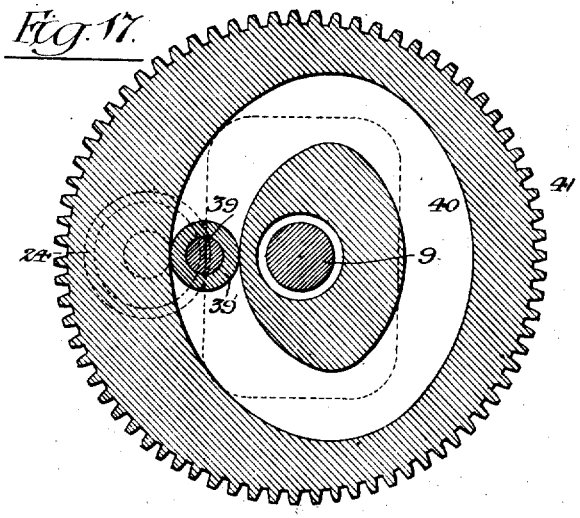
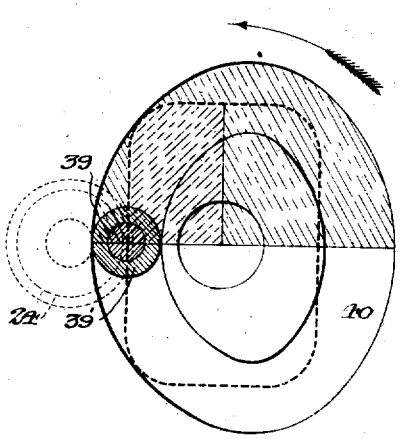
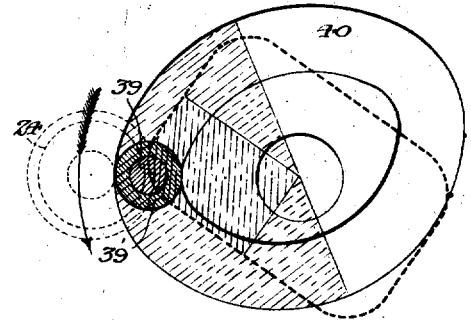
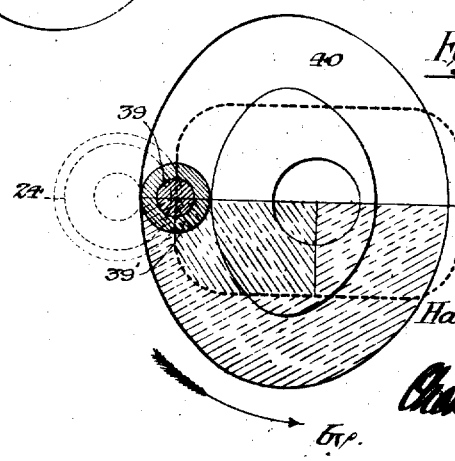

HALVOR HEYERDAHL LYCHE AND VICTOR ODQUIST, OF CHICAGO, ILLINOIS, ASSIGNORS, BY DIRECT AND MESNE ASSIGNMENTS, TO TORRIS WOLD & COMPANY, OF CHICAGO, ILLINOIS, A CORPORATION OF ILLINOIS.

CAN-END-SEAMING MACHINE.

No. 900,108.  Specification of Letters Patent.  Patented Oct. 6, 1908.

Application filed February 7, 1905. Serial No. 244,647

*To all whom it may concern:*

Be it known that we, HALVOR HEYERDAHL LYCHE and VICTOR ODQUIST, citizens of the United States, and residents of Chicago, Cook county, Illinois, have invented a certain new, useful, and Improved Can-End-Seaming Machine, of which the following is a full, clear, and exact description, such as will enable others skilled in the art to which it appertains to make and use the same.

Our invention relates to can-making machines, and has special reference to those machines which are employed for seaming can ends or heads upon can bodies. Such machines are generally known as "double seamers". The can bodies and the can ends or heads which are delivered to such a machine are provided with flanges or extended edges, and the office of the machine is to turn and interlock these flanges to form a double seam which shall tightly join the head to the can body.

The invention relates particularly to improvements upon square-can double seaming machines, as contrasted with the machines which are used for seaming round cans.

The object of our invention is to provide a double seaming can machine which shall be of simple construction, of convenient form and easy of manipulation, and which shall perform its work in a perfect, regular and exact manner.

A particular object of the invention is to provide a seaming machine that shall be capable of tightly closing square cans, such as sardine cans.

A further and special object of the invention is to provide a machine that shall be adapted to manual control and operation; in other words, a semi-automatic double seamer, for use where the work to be performed does not warrant the installation of an automatic double seamer.

Our invention consists, generally, in a can end seaming machine having rotary can holders or chucks, and a seaming roll which is movable adjacent to one of said chucks, in combination with a rotary cam which moves said roll toward and from the axis of said chuck, that it may exactly follow the contour of a square or other non-circular can; together with suitable operating means associated with the parts mentioned. And further, our invention consists in a machine characterized as above and wherein the roll-controlling and moving cam is bodily movable with relation to the axis of aforesaid chuck to engage or disengage the roll and the can. And further, our invention consists in a machine of the class described having a cam-actuated seaming roll, in combination with means for moving said roll longitudinally without reference to the position in which the roll is held by the actuating cam. And further, our invention consists in various details of construction and in combinations of parts, all as hereinafter described and particularly pointed out in the claims.

Our invention will be more readily understood by reference to the accompanying drawings, forming a part of this specification, and in which Figure 1 is a side elevation of a can end seaming machine or double seamer embodying our invention; Fig. 2 is a front elevation of the machine; Figs. 3, 4, 5 and 6 are sectional views of a square can, showing the manner of forming the seam between the body and the end, head or cap; Fig. 7 is an enlarged side elevation of the principal operating parts of the machine, taken from Fig. 1; Fig. 8 is a vertical section, substantially on the plane of the lines $8^\times$—$8^\times$ of Figs. 7 and 10; Fig. 9 is a detail of the seaming roll shifter on line $9^c$—$9^c$ of Fig. 11; Fig. 10 is a horizontal section on the line $10^b$—$10^b$ of Fig. 8; Fig. 11 is a horizontal section on the line $11^a$—$11^a$ of Fig. 8; Fig. 12 is a side view of the seaming roll carrier, removed from its guides; Fig. 13 is a top view of the upper member of said carrier; Fig. 14 is a view of the lower member of the carrier, the parts which extend through the two members being shown in section on the line $14^e$—$14^e$ of Fig. 12; Fig. 15 is a transverse section of the carrier and its guide on the lines $15^f$—$15^f$ of Figs. 8, 12, 13 and 14; Fig. 16 is a similar sectional view on the lines $16^g$—$16^g$ of Figs. 8, 12, 13 and 14, the cam wheel seen in Fig. 8 being disregarded; Fig. 17 is a horizontal section of the cam wheel on the lines $17^h$—$17^h$ of Fig. 8; Figs. 18, 19 and 20 are diagrammatic illustrations of the operation of the cam, the square can and the seaming roll.

As shown in the drawings, we prefer to arrange the working parts of our machine upon standard A, carrying bracket portions, B, C, D and E, wherein the working members are arranged. The bracket, C, is elevated upon parts, F, to provide a space between its bottom plate, C', and the top plate, A', of the standard A, both of which parts are provided with vertical bearings, A² and C², shown in dotted lines in Figs. 1 and 7. The bracket, B, contains bearings for the horizontal power shaft, 2, and has an extension, B', for the clutch operating lever, 3.

4 is the power or belt wheel and 5—6 represent the two parts of a clutch on the shaft, 2. The part, 5, is arranged for operation by lever, 3. Said lever is in effect a bell crank and is connected by a rod, 7, with the treadle, 8, at the base of the machine; 8', is the treadle return spring. The clutch part, 6, also serves as a belt pulley. The bracket, C, contains a horizontal bearing, C³, for pulley shaft, C⁴, bearing mule pulleys, C⁵. The bracket, C, is also provided with vertical bearings, C⁶ and C⁷, for the chuck shaft, 9.

10 is a belt pulley on shaft, 9, and 11 is a belt which passes around the pulley, 10, over pulleys C⁵ and thence down and around clutch pulley, 6.

12 is a short vertical shaft arranged in the bearings, A²—C², and which carries the small gear wheel, 13 and the large gear wheel, 14, the functions of which will be explained hereinafter.

The bracket, D, is vertically adjustable between guides, A³, provided on the standard, A, to which it is secured by a bolt, D¹. The bracket has a vertical bearing, D², which contains the chuck shaft, 15.

The upper end of the chuck shaft, 15, is provided with a bottom chuck plate, 16, preferably round, and provided with a top recess, 16', to receive a can. The opposed chuck, 17, is attached to the lower end of the shaft, 9, and its shape conforms to the shape of the can which is to be operated upon. Its different dimensions are shown in Figs. 7 and 8.

The lower end of the chuck shaft, 15, is seated in a step or socket, 18, on the end of the lever, 19, which is pivoted at 20, on the lower end of the bracket D, to be adjustable therewith. The lever extends through slots in the front and back of the standard, A, and is adjustably attached to a vertical sliding bar, 21, held in a guide, A⁴, on the back of standard, A. The holes 21', in the bar, 21, permit the lever, 19, to be attached thereto in any of the positions of said lever and bracket, D.

22 is a retracting spring for elevating the bar, 21, after it has been depressed. The upper end of the bar, 21, is engaged with a rocking cam, 23, arranged on a short shaft, 23', journaled in the bearing, A⁴. On the end of the shaft, 23', is a short arm, 23'', for operating the cam, 23, and this is connected with the clutch lever, 3, by a link, 23'''.

When the treadle, 8, is depressed by the operator, the arm, 3, will be moved toward the clutch part, 5, into engagement with the part, 6. The cam, 23, being connected with the clutch lever, 3, will be operated at the same time. The cam thus operated will depress the bar, 21; this in turn will operate the lever, 19, and elevate the shaft, 15 and chuck, 16. The cam, 23, has its end portion formed in the arc of a circle having the shaft, 23', as its center and therefore the chuck, 16, will be fully elevated before the completion of the down stroke of the treadle and before the friction clutch part, 5, becomes firmly engaged with the clutch pulley, 6; hence, as the upper portion of the mechanism driven by belt, 11, is the part which actually rotates the cam that is grasped between the two chucks, 16—17, the chuck, 17 and the can will not be rotated until the can has been elevated and firmly pressed into engagement with the upper chuck, 17. The employment of the adjustable bracket, D, the lever, 19, and the bar, 21, adapt the machine for work upon cans of different lengths or depths.

The bracket, E, is an irregular casting which carries the seaming roll and the roll manipulating levers. 24 is the seaming roll referred to. 25 is the lever for moving said roll horizontally and 26 is the lever for moving the roll vertically. The lever movements of the roll are arbitrary, its automatic movement or action being induced by the actuating cam hereinafter described. The lever, 25, is pivoted upon a pin, 25', on one end of the bracket, E, and the opposite end of said bracket, E, is formed with guides, E', for the roll carrier, 27, said guides being perpendicular to the chuck shaft, 9. The movement of the roll carrier is toward and from said shaft, 9. There is another part, which, as it supports the roll, may be described as a portion of the roll carrier. This part, 28, is longitudinally stationary but is arranged for vertical movement. The guide for the part, 28, is a lug, E², on bracket, E. This part holds two pins, 28', to which 28 is attached. The lower ends of the pins, 28' are joined by a block, 28'', having a quadrant portion, 28''', containing a bolt or stud, 29, on which the lever, 26, is arranged. Said lever, 26, is provided with a lug or bolt, 26', and also has a partial gear pinion, 26''. This pinion, 26'' is in mesh with a short gear rack, E³, attached to part E², and it will be obvious that when the lever, 26, is depressed from the position shown in Fig. 8 to the position of Fig. 9, the pins, 28' and the block, 28, will be drawn down. On the return motion the block, 28, will be elevated. This is the portion of the mechanism which is used for adjusting the seaming roll vertically, there being a sliding connection between the seaming roll and the block, 28, to at the same time permit the longitudinal movement of the roll carrier toward and from the chuck shaft. The roll carrier is inserted in the guide, E', from beneath and is held therein by plates, E⁴.

The roll carrier is made in two parts—30 and 31. The lower part, 30, best shown in Figs. 8, 12, 14, 15 and 16, fits the guide, E', and at its end is provided with a vertical bearing, 32. In the bearing, 32, is the short shaft, 33, on which the seaming roll, 24, is mounted. A pin, 34, extends through a slot, 35, in the side of the part, 30, and carries an anti-friction roller, 34', that is held in the horizontal groove, 28ᵃ, of the vertically movable block, 28. In this manner the seaming roll is connected with the vertical adjustment block, 28, that is movable by means of aforesaid lever, 26. The lower part of the roll carrier contains slots, 36—36, and the upper part, 31, of the carrier is joined to the lower part by two bolts, 37—37, by which the connection is made adjustable. The upper part of the carrier, shown in Figs. 8, 12, 13, 15 and 16, contains holes for the bolts, 37, and a slot, 38, to accommodate the upper end of the roll bearing, 32. At the inner end of the part, 31, is a vertical pin or stud, 39, carrying an anti-friction roll, 39', for engagement with the cam groove 40, of the roll actuating wheel, 41. The upper and lower parts of the roll carrier, though adjustable are normally fastened together, therefore the center of the cam stud, 39, is fixed with relation to the center of the seaming roll. It will be obvious, therefore, that the seaming roll can be moved horizontally only through the medium of the cam, 40, with which it is engaged. The cam wheel, 41 has a central opening, 42, which is larger than the shaft, 9; hence, the cam wheel may be shifted horizontally to arbitrarily move the seaming roll toward or from the cam chuck. Said cam wheel, 41, is provided with gear teeth, 41', which mesh with the gear wheel, 14. The gear, 14, is secured upon the shaft, 12, and hence to the smaller gear wheel, 13, and the latter is driven by a large gear wheel, 43, that is fastened upon the shaft, 9. These gears, 43, 13, 14 and 41 are so proportioned that the cam wheel, 41, shall run at twice the speed of the wheel, 43, and chuck shaft, 9; that is, the cam revolves twice during each single revolution of the cam chuck, 17.

As a means for holding the gear, 41, in mesh with the gear, 14, and for arbitrarily shifting the cam and the seaming roll, we employ a bell-crank-like ark, 44, the rear end of which is journaled upon the shaft, 12. (See Figs. 7 and 11). The forward end of the arm contains a bearing, 44', for the central boss, 41'', of the gear or cam wheel, 41, and the other arm of the bell-crank is connected to the lever 25. (See Figs. 8 and 11).

The lever, 25, secured to the bracket, E, by stud, 25', is provided with a pin, 25'', that enters a slot, 44'', in the bell-crank arm, and when the lever is moved from the position shown in Figs. 8 and 10, the bell crank and therefore the cam wheel, 41, will be moved laterally with relation to the chuck shaft, 9. Regardless of the position of the cam roller, 39', in the cam groove, the seaming roller will be moved away from the chuck, 17, by this movement of the lever, 25. Upon the return movement of the lever, 25, the bell crank, 44, will be shifted to center the cam wheel, 41, around the shaft, 9, thereby restoring the seaming roll to its proper working relation to the chuck, 17, and the cam held thereby.

The construction of the cam and its effect upon the seaming roll will be best understood by reference to Figs. 8, 17, 18, 19 and 20. In considering these views, it must first be remembered that the cam revolves twice during each revolution of the can which is held in the chucks. In Figs. 17 to 20, the substantially rectangular dotted forms represent the can, while the full lines represent the cam groove and the roller which is held therein. The cam begins its operation at the point of contact with the smallest radius of the can, as shown in Figs. 17 and 18, during one revolution operates upon one-half of the can's periphery, the can being again found in the Fig. 17 position when the seaming roll meets the corresponding short radius at the opposite side of the can. The longer radii of the cam correspond to the corners of the can, while the intermediate radius corresponds to the longitudinal radius of the can extending between the can center and the flat end of the can. The curves produced in the cam groove result from the shape of the corners of the can and the relatively angular attack of the seaming roll upon the sides and ends of the can. Figs. 18, 19 and 20 illustrate the operation during a half turn of the cam and a quarter turn of the can, the remainder of the cam's revolution being the reverse thereof. It will be obvious that the shape of the cam is determined by the shape of the can which is to be seamed. Different sizes of cans of substantially the same shape may, however, be seamed upon the machine without necessitating a change of cams, the only necessity being the adjustment of the parts of the roll carrier. It is usual, also, to change the chucks, 16 and 17 when adapting the machine to cans of different dimensions.

It will be obvious that our machine may be employed for heading or seaming round cans in which case the cam wheel, 41, will be thrown out of action and remain stationary to hold the seaming roll in a fixed position. It is also obvious that the seaming roll may be variously shaped according to the form of seam that is to be rolled. The seaming roller herein illustrated is intended for performing the operations upon the can flanges, and the can parts which are furnished to the machine should be of the form shown in Fig. 3, the can body being provided with a flange, a, and the can top cover or head with a downwardly turned flange, b. Fig. 4 illustrates the first operation upon the can. This is performed by the lowermost flanges and groove, 24', of the roller, the same when moved against the rotating can operating to throw the flange, b, under the flange, a, of the can body. For the next operation the roll, 24, is moved down to permit the next pair of flanges and groove, 24'', to operate upon the folded flange, b, and turn the same as shown in Fig. 5, after which the roll is depressed to the next position, 24''', and presses the seam close against the side of the can body, as shown in Fig. 6, thereby completing the double seam and making a very tight joint between the can body and the cover. The vertical movement of the seaming roll may occur during the revolution of the can by operating the lever, 26.

The operation of our invention as outlined, is as follows: The machine being made ready, the operator will place a loosely covered can upon the chuck, 16, and by a partial depression of the treadle, 8, will elevate the chuck, 16, to force the cover of the can against the chuck, 17, the chuck, 17, being fitted into the usual depression in the can top or cover. The further depression of the treadle moves the clutch part, 5, into engagement with the clutch part, 6, and thereby starts the rotating parts of the machine into operation. Meantime the lever, 25, will have been in its rear position and the lever, 26, in its raised position, with the roll out of contact with the can. By throwing forward the lever, 25, the operator shifts the cam wheel, 41, and thereby moves the roll, 24, into contact with the edge of the rapidly rotating can, and the roll in following the edge produces the first effect described above. After this first operation of the seaming roll, the operator throws the roll out of engagement with the cam by means of the shift lever, 25, depresses the lever, 26, to lower the seaming roll, 24 and then throws the roll again into engagement with the cam by means of the lever, 25. Each subsequent step in finishing the seam is accomplished in the same manner. It will be understood that though the roll carrier is rapidly reciprocated by the rotating cam, the roll, 24, will be held in any of its given positions by the grooved sustaining block, 28, in sliding engagement with the vertically movable shaft of said roller. Upon the completion of the final seaming operation, the operator will first move the seaming roll away from the can by throwing back the lever, 25, and will then release the treadle to drop the can chuck, 16, with the completed can.

It will be obvious that our mechanism may be arranged in a horizontal instead of a vertical position, and further, that numerous other modifications will readily suggest themselves to one skilled in the art. We therefore do not confine the invention to the specific constructions herein shown and described.

Having thus described our invention, we claim as new, and desire to secure by Letters Patent:

1. In a machine for turning flanges upon non-circular cans or vessels, the combination, of suitable chucks for holding a can, with a seaming device adjacent thereto, a cam engaged with said device for moving the same toward and from the axis of said chucks, and means for shifting the cam to remove said seaming device from its position adjacent to said chucks, substantially as described.

2. In a machine for turning flanges upon non-circular cans or vessels, a can chuck, in combination with a seaming device adjacent thereto, a cam engaged with said seaming device for causing the same to follow the contour of a can held by said chuck, means for rotating said chuck at a certain speed, and means for rotating said cam at a higher speed, substantially as described.

3. In a machine for turning flanges upon non-circular cans or vessels, a can chuck, in combination with a seaming device adjacent thereto, a cam for moving said device toward and from the axis of said chuck to continuously conform the position of said device to the shape of a can held in said chuck, and means for rotating said chuck and said cam at different speeds, substantially as described.

4. In a machine for turning flanges upon non-circular cans or vessels, the can chucks and means for rotating the same, in combination with a flanging device adjacent thereto, a cam rotating at a higher speed than said chucks, the arrangement of parts being such that each revolution of said cam causes said flanging device to relatively follow or conform to a portion only of the perimeter of the can that is held in said chucks, substantially as described.

5. In a machine for turning flanges upon non-circular cans or vessels, suitable can chucks, in combination with a flanging device adjacent thereto, a cam for moving said device toward and from the axis of said chucks, said cam being so rotated and formed that successive revolutions thereof cause said device to conform to successive portions of the perimeter of a can held in said chucks, substantially as described.

6. In a machine for turning flanges upon non-circular cans or vessels, suitable can chucks, in combination with a flange turning device adjacent to one of said chucks, a rotary cam engaged with said device, rotated at a higher speed than said chucks, and causing the position of said device to conform to every radius of the can held in said chucks, substantially as described.

7. In a machine for turning flanges upon non-circular cans or vessels, suitable chucks to hold a can or vessel, in combination with a cam, means for rotating said cam, means for shifting said cam laterally, and a flange turning device constantly engaged with said cam for operation thereby, substantially as described.

8. In a machine for turning flanges upon non-circular cans or vessels, suitable chucks for holding a can or vessel, in combination with a cam normally concentric with said chucks, a flange turning device engaged with said cam for movement thereby, and means for shifting said cam to withhold or remove said device from its normal position adjacent to said chucks, substantially as described.

9. In a machine for turning flanges or seams upon non-circular cans or vessels, the chucks and means for rotating the same, in combination with a cam and means for rotating said cam at a higher speed than said chucks, a flange and seam turning device connected with said cam for operation thereby, and means for shifting said cam to remove or withhold said device, substantially as described.

10. In a machine for turning flanges or seams upon non-circular cans or vessels, suitable can chucks, in combination with means for rotating said chucks and a can held thereby, a cam, means for rotating said cam, a flange turning and seaming device conformed to the can by the action of said cam, means for shifting said cam and said device laterally, and means for shifting said device longitudinally during the operation thereof by said cam, substantially as described.

11. In a machine for flanging or seaming cans, suitable chucks and means for rotating the same, in combination with a seaming roll, a carrier therefor, a cam, means for rotating said cam, means connecting said carrier and cam, and means for shifting said cam, substantially as described.

12. In a machine for flanging or seaming cans, suitable chucks and means for rotating the same, in combination with a flanging and seaming roll, a carrier for said roll, a cam for operating said carrier, and means for rotating said cam at a higher speed than said chucks, substantially as described.

13. In a machine for seaming or flanging cans, suitable chucks and means for rotating the same, in combination with a flanging and seaming roll, a vertically adjustable carrier for said roll, means for shifting said roll upon said carrier during the movement of the latter, and means for moving said carrier to cause said roll to conform to the shape of a can held in said chucks, substantially as described.

14. In a machine for flanging or seaming can ends upon can bodies, suitable chucks and means for operating same to grasp and rotate a can, in combination with a seaming roll, a carrier for said roll, a cam for actuating said carrier during the rotation of said chucks, means for shifting said cam and thereby said roll and carrier, and means for moving said roll with relation to its carrier at any time, substantially as described.

15. In a machine for flanging or seaming non-circular cans, suitable chucks and means for rotating the same, in combination with a cam, means for rotating the cam at twice the speed of said chucks and a seaming roll connected with said cam for movement thereby, substantially as described.

16. In a machine for flanging or seaming cans or vessels, suitable chucks for holding the can or vessel, in combination with a flanging and seaming roll adjacent to one of said chucks, a cam wheel normally substantially concentric with said chucks and provided with a cam, means positively and continuously engaging said cam and roll, and means for shifting said cam to shift said roll, substantially as described.

17. In a machine for flanging or seaming cans or vessels, suitable chucks and means for rotating the same, in combination with a cam wheel that is normally substantially concentric with said chucks, means for rotating said cam wheel more rapidly than said chucks, means for shifting said wheel laterally, a cam upon said wheel corresponding to the shape of one of several portions of the can to be flanged or seamed, a flanging and seaming roll, a carrier therefor movable perpendicularly with respect to the axis of said chucks, and means connecting said carrier and cam, substantially as described.

18. In a machine for flanging or seaming cans or vessels, suitable chucks and means for rotating the same, in combination with a cam wheel that is normally substantially concentric with said chucks, means for rotating said cam wheel more rapidly than said chucks, means for shifting said wheel laterally, a cam upon said wheel corresponding to the shape of one of several portions of the can to be flanged or seamed, a flanging and seaming roll, a carrier therefor movable perpendicularly with respect to the axis of said chucks, means connecting said carrier and cam, a stationary member and means thereon for moving said roll longitudinally during its operation by said cam, substantially as described.

19. In a machine for flanging or seaming cans, suitable chucks and means for rotating the same, in combination with a flanging and seaming roll adjacent to one of said chucks, a carrier for said roll, vertical guides for said carrier, a rotary cam engaged with said carrier, and means for sustaining the roll in said carrier, said means being adjustable to move said roll longitudinally, substantially as described.

20. In a machine for flanging or seaming non-circular cans, the combination of suitable chucks with means for rotating the same, a seaming roll adjacent to one of said chucks, a roll operating cam wheel, a gear for driving said cam wheel, a link connecting said gear and cam wheel, and means for shifting said link to move said cam wheel and roll, substantially as described.

21. In a can end seaming machine, a suitable frame, in combination with chuck shafts arranged in said frame, chucks upon said shafts, means for successively closing the chucks upon a can and starting one of said shafts into rotation, a seaming roll, a carrier therefor, a guide for said carrier upon said frame, a shiftable rotating cam engaged with said carrier, and means upon said frame for shifting said cam to move said roll into or out of engagement with a can held by said chucks, substantially as described.

22. In a machine of the class described, a rotary chuck and its shaft, in combination with means for driving said shaft, a cam which is normally substantially concentric with said shaft, a gear for driving said cam, means for holding said cam in engagement with said gear, means for shifting said cam without disengaging the same from said gear, and a seaming roll connected to said cam for actuation thereby, substantially as described.

23. In a machine of the class described, a suitable frame, in combination with chuck shafts and chucks held thereon, a seaming roll, a carrier therefor, a cam for reciprocating said carrier, means slidably connecting said roll and carrier, a guide block constantly engaged with said roll, and means upon said frame for holding and moving said guide block to shift said roll longitudinally, substantially as described.

24. In a machine of the class described, suitable can chucks, in combination with a seaming roll and means causing said seaming roll to move toward and from the axis of said chucks to conform to the shape of the can to be seamed, and means for simultaneously or non-simultaneously moving said roll laterally and longitudinally with respect to said chucks, substantially as described.

25. In a machine of the class described, a suitable frame, in combination with chuck shafts and chucks, a guide upon said frame, a seaming roll carrier arranged in said guide, and composed of relatively adjustable parts, a seaming roll actuating cam connected with one of the parts of said carrier, and a seaming roll adjustable with the other part of said carrier, substantially as described.

In testimony whereof, we have hereunto set our hands, this 31st day of December, 1904, at Chicago, county of Cook and State of Illinois, in the presence of two witnesses.

HALVOR HEYERDAHL LYCHE.
VICTOR ODQUIST.

Witnesses:
CHARLES GILBERT HAWLEY,
JOHN R. LEFEVRE.